United States Patent
Li et al.

(10) Patent No.: US 11,732,894 B2
(45) Date of Patent: Aug. 22, 2023

(54) PULSE DETONATION COMBUSTION SYSTEM

(71) Applicant: XI'AN THERMAL POWER RESEARCH INSTITUTE CO.LTD, Shaanxi (CN)

(72) Inventors: Xiaofeng Li, Shaanxi (CN); Junfeng Xiao, Shaanxi (CN); Mengqi Hu, Shaanxi (CN); Feng Wang, Shaanxi (CN); Wei Wang, Shaanxi (CN); Lin Xia, Shaanxi (CN)

(73) Assignee: XI'AN THERMAL POWER RESEARCH INSTITUTE CO.LTD, Shaanxi (CN)

( * ) Notice: Subject to any disclaimer, the term of this patent is extended or adjusted under 35 U.S.C. 154(b) by 0 days.

(21) Appl. No.: 17/740,612

(22) Filed: May 10, 2022

(65) Prior Publication Data
US 2022/0275943 A1    Sep. 1, 2022

Related U.S. Application Data

(63) Continuation of application No. PCT/CN2020/104842, filed on Jul. 27, 2020.

(30) Foreign Application Priority Data

Jun. 3, 2020 (CN) .......................... 202010496107.5

(51) Int. Cl.
*F23R 7/00* (2006.01)
*F02C 5/12* (2006.01)

(52) U.S. Cl.
CPC . *F23R 7/00* (2013.01); *F02C 5/12* (2013.01)

(58) Field of Classification Search
CPC .... F02K 7/06; F02K 7/067; F02C 5/12; F23R 7/00
See application file for complete search history.

(56) References Cited

U.S. PATENT DOCUMENTS 2,523,378 A * 9/1950 Kollsman ................. F02K 7/06
                                                      60/247
2,609,660 A * 9/1952 Tenney ..................... F02K 7/06
                                                      60/39.77
(Continued)

FOREIGN PATENT DOCUMENTS

CN        101776027 A  *  7/2010
CN        101881238 A     11/2010
(Continued)

OTHER PUBLICATIONS

WIPO, International Search Report for International Application No. PCT/CN2020/104842, dated Feb. 24, 2021.
(Continued)

*Primary Examiner* — Ted Kim
(74) *Attorney, Agent, or Firm* — Hodgson Russ LLP

(57) ABSTRACT

A pulse detonation combustion system includes: an inlet pipe; an intake cone disposed in the inlet pipe, having an end provided with a pneumatic valve, and including an atomizing air transfer tube, a fuel transfer tube, and a conical swirl nozzle connected to the atomizing air transfer tube and the fuel transfer tube; an atomizing air intake tube connected with the atomizing air transfer tube; a fuel supply tube connected with the fuel transfer tube; a pulse detonation combustion chamber located downstream of and communicated to the inlet pipe, and provided with a spark plug mounting seat for mounting a spark plug; a gas energy distribution adjustment device located downstream of and communicated to the pulse detonation combustion chamber; and a transition section located downstream of and communicated to the gas energy distribution adjustment device.

18 Claims, 2 Drawing Sheets

(56) References Cited

U.S. PATENT DOCUMENTS

| | | | | | |
|---|---|---|---|---|---|
| 2,635,421 | A | * | 4/1953 | Blum | F02K 7/20 |
| | | | | | 60/39.8 |
| 4,290,558 | A | * | 9/1981 | Coburn | F23L 7/002 |
| | | | | | 60/748 |
| 4,715,807 | A | * | 12/1987 | Yokoyama | F23C 15/00 |
| | | | | | 60/39.77 |
| 2007/0015099 | A1 | * | 1/2007 | Wiedenhoefer | F02K 7/02 |
| | | | | | 431/346 |
| 2013/0145746 | A1 | * | 6/2013 | Graber | F02K 9/97 |
| | | | | | 60/247 |

FOREIGN PATENT DOCUMENTS

| | | | | | |
|---|---|---|---|---|---|
| CN | 101956631 | | | 1/2011 | |
| CN | 101975123 | A | * | 2/2011 | |
| CN | 103867338 | | | 6/2014 | |
| CN | 103953461 | A | | 7/2014 | |
| CN | 104033248 | A | * | 9/2014 | |
| CN | 108443912 | A | | 8/2018 | |
| CN | 109209681 | A | * | 1/2019 | |
| CN | 109506249 | A | * | 3/2019 | F23R 3/28 |
| CN | 109681678 | A | * | 4/2019 | F02K 7/02 |

OTHER PUBLICATIONS

CNIPA, , First Office Action for CN Application No. 202010496107.5, dated Mar. 23, 2023.

* cited by examiner

PULSE DETONATION COMBUSTION SYSTEM

CROSS-REFERENCE TO RELATED APPLICATIONS

This application is a continuation of International Application No. PCT/CN2020/104842, filed Jul. 27, 2020, which claims priority to and benefits of Chinese Patent Application No. 202010496107.5, filed Jun. 3, 2020, the entire contents of which are incorporated herein by reference.

FIELD

The present disclosure relates to a field of combustion systems, and more particularly to a pulse detonation combustion system with a detonation gas energy distribution adjustment device, and a use of a pulse detonation combustion system with a detonation gas energy distribution adjustment device in a gas turbine power generator and a power plant.

BACKGROUND

In existing power devices, such as aero-engines and ground-based gas turbines, a constant pressure combustion chamber is generally adopted. During a process that injected fuels burn in the constant pressure combustion chamber, the gas pressure in the chamber is basically unchanged or slightly reduced. A cycle thermal efficiency of the existing power device depends on a pressure ratio (i.e., a ratio of a boost pressure to an initial pressure). The existing ground-based gas turbines require a compressor to increase the pressure ratio, when the pressure ratio is too large, the initial temperature of air entering the combustion chamber increases significantly, then the amount of heat that can be added to the combustion chamber is reduced due to the allowable operating temperature limit of the turbine blades, resulting in a reduction of the output power of the power device.

SUMMARY

The present disclosure provides a pulse detonation combustion system, including: an inlet pipe; an intake cone disposed in the inlet pipe, having an end provided with a pneumatic valve, and including an atomizing air transfer tube, a fuel transfer tube, and a conical swirl nozzle connected to the atomizing air transfer tube and the fuel transfer tube; an atomizing air intake tube extending from the inlet pipe into the intake cone, and connected with the atomizing air transfer tube; a fuel supply tube extending from the inlet pipe into the intake cone, and connected with the fuel transfer tube; a pulse detonation combustion chamber located downstream of and communicated to the inlet pipe, and provided with a spark plug mounting seat for mounting a spark plug; a gas energy distribution adjustment device located downstream of and communicated to the pulse detonation combustion chamber; and a transition section located downstream of and communicated to the gas energy distribution adjustment device.

In an embodiment, the inlet pipe has a rectangular cavity, and is configured to introduce air into the pulse detonation combustion chamber.

In an embodiment, the intake cone includes a conical head and a cylindrical main body, and is configured to atomize a liquid fuel and inject the atomized fuel into the pulse detonation combustion chamber.

In an embodiment, the conical swirl nozzle of the intake cone is configured to shear and break the liquid fuel into droplets under a shearing action of an atomizing air.

In an embodiment, the pneumatic valve includes: an intake orifice plate, having a first rectangular plate formed with a plurality of air intake holes evenly and equidistantly spaced apart from each other; a detonation wave cut-off plate, having a second rectangular plate; and an intake cup, having a rectangular cavity and defining an opening at one end and providing holes at the other end.

In an embodiment, the detonation wave cut-off plate is movable in an axial direction of the intake cone.

In an embodiment, when the pulse detonation combustion chamber is filled with fresh air and the fuel, the detonation wave cut-off plate moves to a downstream direction of airflow under an action of an intake pressure until it is stopped by the intake cup to completely cover the holes of the intake cup.

In an embodiment, a cavity is formed by a side wall of the intake cup and the inlet pipe to allow the fresh air to flow into the pulse detonation combustion chamber.

In an embodiment, when a detonation combustion back-propagation wave is generated in the pulse detonation combustion chamber and propagated upstream of the pulse detonation combustion chamber towards the inlet pipe, the detonation wave cut-off plate moves to an upstream direction of airflow under an action of a pressure of the detonation combustion back-propagation wave until it is stopped by the intake orifice plate to completely cover the air intake holes of the intake orifice plate.

In an embodiment, the pulse detonation combustion chamber has a straight tubular cavity with a rectangular cross section, and is configured to fill and mix air and fuel to form a combustible mixture.

In an embodiment, the spark plug is configured to ignite the combustible mixture.

In an embodiment, the gas energy distribution adjustment device has a straight tubular cavity and is configured to separate a pulse detonation gas flow formed in the pulse detonation combustion chamber into a plurality of gas flows. The gas energy distribution adjustment device includes a plurality of gas baffles with a same axial length, configured to divide the straight tubular cavity into a plurality of injecting channels with a convergence or expansion ratio.

In an embodiment, the convergence or expansion ratio ranges from 1 to 3.

In an embodiment, the injecting channels are stacked in a radial direction, and the injecting channel with the convergence ratio and the injection channel with the expansion ratio are alternatively arranged.

In an embodiment, the gas energy distribution adjustment device is divided by three gas baffles to form a first injecting channel, a second injecting channel, a third injecting channel and a fourth injecting channel.

In an embodiment, the first injecting channel has an expansion ratio of 1.44, the second injecting channel has a convergence ratio of 2.21, the third injecting channel has an expansion ratio of 1.90, and the fourth injecting channel has a convergence ratio of 1.43.

In an embodiment, the inlet pipe has a length of 500 mm, a width of 200 mm, a height of 100 mm, and a wall thickness of 3 mm.

In an embodiment, the pulse detonation combustion chamber has a length of 1400 mm, a width of 200 mm, a height of 100 mm, and a wall thickness of 3 mm.

In an embodiment, the gas energy distribution adjustment device has an axial length of 300 mm, a width of 200 mm, a height of 100 mm, and a wall thickness of 3 mm.

In an embodiment, the transition section is configured to discharge a pulse detonation gas formed in the pulse detonation combustion chamber, and connect the gas energy distribution adjustment device to a turbine component located downstream.

REFERENCE NUMBERS

Figure 1:
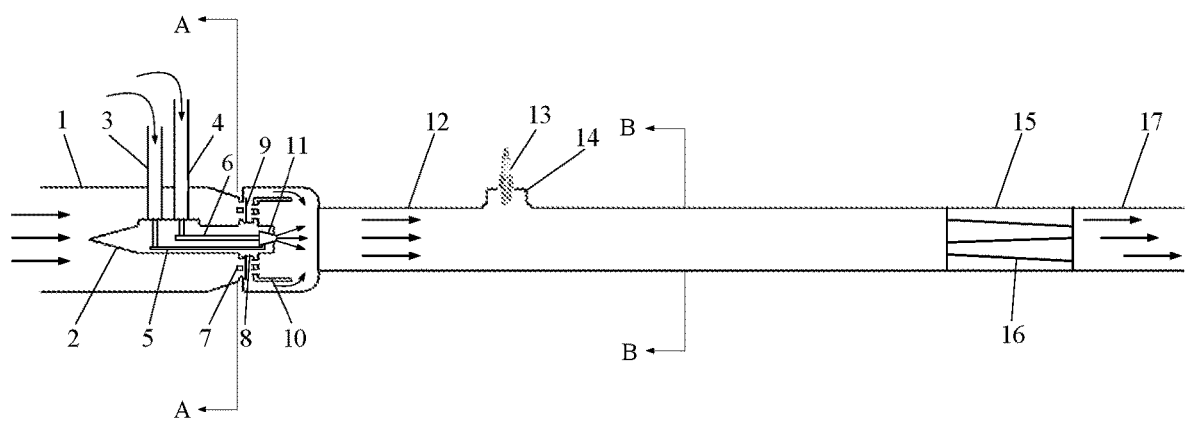
FIG. 1 is a schematic diagram showing a pulse detonation combustion system according to an embodiment of the present disclosure.

1: inlet pipe; 2: intake cone; 3: atomizing air intake tube; 4: fuel supply tube; 5: atomizing air transfer tube; 6: fuel transfer tube; 7: intake orifice plate; 8: pneumatic valve; 9: detonation wave cut-off plate; 10: intake cup; 11: conical swirl nozzle; 12: pulse detonation combustion chamber; 13: spark plug; 14: spark plug mounting seat; 15: gas energy distribution adjustment device; 16: gas baffle; 17: transition section.

DETAILED DESCRIPTION

For a better understanding of the present disclosure, and making technical solution of the present disclosure more clear, the present disclosure will now be described by way of embodiments with reference to the drawing. It should be clarified that the embodiments described are only a part of embodiments of the present disclosure, and are not all of the embodiments thereof, which shall not be construed to limit the scope of the present disclosure. In addition, well-known structures and technologies are omitted in order to avoid obscuring the concepts of the present disclosure. Other embodiments obtained by those skilled in the art based on the embodiments of the present disclosure without creative efforts shall fall within the protection scope of the present disclosure.

The drawing shows a schematic structure of components according to some embodiments of the present disclosure. The components in the drawing may be not entirely illustrated according to the proportional scale. In order to show the structure clearly, details of some components may be enlarged and details of some other components may be omitted. The illustrated shapes of various regions and layers in the drawing and their relative sizes and positional relationships are only exemplary. In practice, there may be deviations due to manufacturing tolerances or technical limitations, and those skilled in the art may additionally design regions/layers with different shapes, sizes, and relative positions according to actual needs.

In the context of the present disclosure, when a layer/element is referred to as being "above" another layer/element, it can be directly on the other layer/element or intervening layers/elements may be present therebetween. In addition, if a layer/element is "above" another layer/element in one orientation, then when the orientation is reversed, the layer/element may be "below" the other layer/element.

It should be noted that the terms "first", "second" and the like in specification and in claims, are used for distinguishing between similar elements and not necessarily for describing a sequential or chronological order. It is to be understood that the terms so used are interchangeable under appropriate circumstances and that the embodiments described herein are capable of operation in other sequences than described or illustrated herein. Furthermore, the terms "comprising" and "including" and any variations thereof, are intended to cover a non-exclusive inclusion. For example, a process, method, system, product or device including a series of operations or units is not necessarily limited to those operations or units expressly listed, but may also include operations or units not expressly listed or inherently owed by such a process, method, product or device.

A pulse detonation combustion chamber is a new type of combustion chamber based on detonation combustion. Compared with isobaric combustion, the detonation combustion chamber can be self-pressurized, and has a high flame propagation speed and a low pollutant emission, which may be used for a power device to improve overall performance of the power device.

Due to the self-pressurization of the detonation combustion, during the combustion of the fuels injected into the detonation combustion chamber, the gas pressure in the detonation combustion chamber rises. For the power devices, such as aero-engines and ground-based gas turbines, after the constant pressure combustion chamber is replaced by the detonation combustion chamber, a compressor stage may be reduced, thus reducing the compression work burdens for the compressor, indirectly increasing an efficiency of power generation of the high-temperature gas obtained from the fuel combustion, and improving a cycle thermal efficiency of the power device. In addition, the pulse detonation combustion flame propagates at a speed of the detonation wave, which may reach thousands of kilometers per second, and is several thousand times a flame propagation speed of the isobaric combustion, and thus the detonation combustion has a good flame stability, which may solve the combustion stability problem of lean premixed low-nitrogen combustion. At the same time, the pulse detonation combustion is a kind of premixed combustion with a fast combustion speed and a short residence time of combustion products maintained in the high temperature zone, which may reduce generation of pollutants such as NOx.

Further, The inventors have found that the high-temperature and high-pressure gas generated after the pulse detonation combustion has a strong pulsation characteristic, the energy is mainly concentrated at the detonation combustion stage, the detonation combustion speed is fast, a ratio of a period of the detonation combustion to a working cycle is small, the turbine under a quasi-steady flow design condition has a low efficiency for converting the energy of the detonation gas, and most of the energy has been discharged before it can be used. After the pulse detonation wave is formed in the pulse detonation combustion chamber, a pressure at the head of the combustion chamber increases, a combustion compression wave may be reversed into a combustion chamber intake pipeline, which affects a normal operation of the compressor.

In order to improve a cycle thermal efficiency of aero-engines or ground-based gas turbines based on the pulse detonation combustion, and solve the problems of the concentrated energy density of the high temperature gas of the pulse detonation combustion, low efficiency of a turbine for converting and extracting the energy of the detonation gas, and back-propagation of the detonation combustion wave, the present disclosure provides a pulse detonation combustion system with a detonation gas energy distribution adjusting device. Based on a supersonic propagation of the pulse detonation combustion wave, a plurality of injecting channels with different convergence/expansion ratios are provided at an outlet of the detonation combustion chamber. The convergence injecting channel and the expansion injecting channel have same axial length, and are stacked and alternatively arranged in a radial direction. The supersonic detonation gas is firstly separated into a plurality of high-temperature gas flows at different space scales, i.e., in the different channels, and according to the supersonic gas aerodynamic characteristics of the acceleration in an expansion injecting channel and deceleration in an convergence injecting channel, then the gas is separated in time scale, that is, the moments of the plurality of spatially separated detonation gas flows reaching the outlets of the channels are different, so as to separate the original strong pulse detonation gas into a plurality of weak detonation gases. In this way, the time period of the high-energy gas maintained in a single cycle may be prolonged, and the energy distribution of the pulse detonation gas may be adjusted to meet the existing turbine quasi-steady state inflow design conditions, thereby improving the energy conversion efficiency of the pulse detonation gas. At the same time, the present disclosure provides a pneumatic valve structure that may adaptively follow a working frequency of the pulse detonation combustion chamber, such that the pneumatic valve may be automatically opened by a combustion chamber intake pressure difference, and the pneumatic valve may be automatically closed by a pressure caused by the detonation combustion back-propagation wave. Therefore, the negative effect of the detonation combustion back-propagation wave on the compressor can be avoided.

Embodiments of the present disclosure provide a pulse detonation combustion system with a gas energy distribution adjustment device. The pulse detonation combustion system includes an inlet pipe, a combustion chamber, a gas energy distribution adjustment device and a transition section communicated in sequence. The inlet pipe is provided with an intake cone. The intake cone includes an atomizing air transfer tube, a fuel transfer tube and a conical swirl nozzle. The atomizing air transfer tube is connected with an atomizing air intake tube extending from the inlet pipe into the intake cone. The fuel transfer tube is connected with a fuel supply tube extending from the inlet pipe into the intake cone. The conical swirl nozzle is connected to the atomizing air transfer tube and the fuel transfer tube. The intake cone has an end provided with a pneumatic valve. The combustion chamber is provided with a spark plug mounting seat for mounting a spark plug.

In some embodiments, the inlet pipe has a rectangular cavity, and is configured to introduce air to the combustion chamber.

In some embodiments, the intake cone includes a conical head and a cylindrical main body, and is configured to atomize a liquid fuel and inject the atomized fuel into the combustion chamber.

In some embodiments, the pneumatic valve includes an intake orifice plate, a detonation wave cut-off plate and an intake cup. The intake orifice plate has the first rectangular plate formed with a plurality of air intake holes evenly and equidistantly spaced apart from each other. The detonation wave cut-off plate has the second rectangular plate. The intake cup has a rectangular cavity with an opening and a hole.

When the combustion chamber is filled with fresh air and fuel, the detonation wave cut-off plate moves to a downstream direction of airflow under an action of an intake pressure until it is stopped by the intake cup to completely cover the hole of the intake cup, and the fresh air is injected into the combustion chamber from a cavity formed by the intake cup and the inlet pipe.

When a detonation combustion back-propagation wave is generated in the combustion chamber and propagated upstream of the combustion chamber towards the inlet pipe, the detonation wave cut-off plate moves to an upstream direction of airflow under an action of a pressure of the detonation combustion back-propagation wave until it is stopped by the intake orifice plate to completely cover the air intake holes in the intake orifice plate so as to block upstream propagation of the detonation combustion back-propagation wave.

In some embodiments, the combustion chamber has a straight tubular cavity with a rectangular cross section, and is configured to fill and mix air and fuel to form a combustible mixture. The spark plug is configured to ignite the combustible mixture to generate a detonation combustion wave in a propagation direction of airflow and release heat.

In some embodiments, the gas energy distribution adjustment device has a straight tubular cavity and is configured to separate a pulse detonation gas formed in the combustion chamber into a plurality of fuel gases at different time and space. The gas energy distribution adjustment device includes a plurality of gas baffles with a same axial length, and the gas baffles are configured to divide the straight tubular cavity into a plurality of injecting channels with different convergence ratios and expansion ratios.

In some embodiments, the transition section is configured to discharge a pulse detonation gas formed in the combustion chamber, and connect the gas energy distribution adjustment device to a turbine component located downstream.

The present disclosure provides the pulse detonation combustion chamber with the gas energy distribution adjustment device. A plurality of injecting channels with different convergence or expansion ratios are provided at different radial positions of the outlet of the pulse detonation combustion chamber. According to the supersonic gas aerodynamic characteristics of the acceleration in an expansion injecting channel and deceleration in a convergence injecting channel, a strong pulse detonation gas flow is separated into a plurality of weak high-temperature detonation gas flows in terms of time and space, which may increase a time proportion of the high-energy gas in a single working cycle, and adjust the energy distribution of the pulse detonation gas. In addition, the present disclosure provides the pneumatic valve structure with the high-speed adaptive response following the working frequency of the pulse detonation combustion chamber, such that the pneumatic valve may be automatically opened by the combustion chamber intake pressure difference, and the pneumatic valve may be automatically closed by the pressure caused by the detonation combustion back-propagation wave, thereby avoiding an influence of the detonation combustion back-propagation wave on the compressor.

Specific embodiments of the present disclosure will be described in detail below with reference to the drawing.

As shown in FIG. 1, the present disclosure provides a pulse detonation combustion system with a gas energy distribution adjustment device. The pulse detonation combustion system includes an inlet pipe 1, an intake cone 2, a pneumatic valve 8, a pulse detonation combustion chamber 12, a spark plug 13, a gas energy distribution adjustment device 15 and a transition section 17.

The inlet pipe 1 has a rectangular cavity (shown in FIG. 3), and is configured to introduce air into the pulse detonation combustion chamber 12. The intake cone 2 and the pneumatic valve 8 are provided inside the inlet pipe 1.

Figure 2:
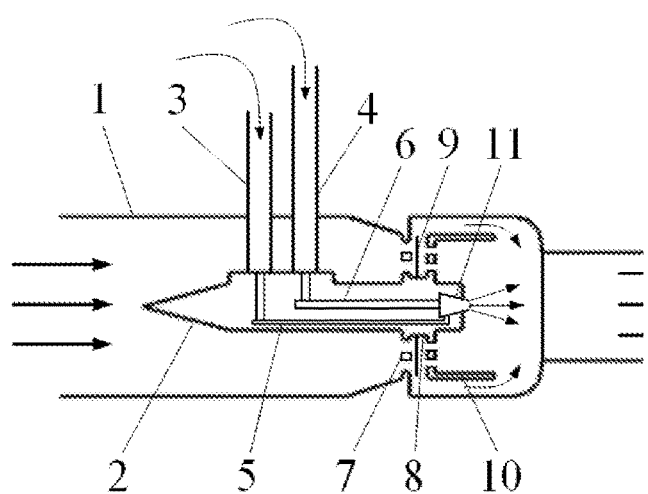
FIG. 2 is a schematic diagram showing an enlarged portion of the left side of FIG. 1.

As shown in FIG. 2, the intake cone 2 includes a conical head and a cylindrical main body. The intake cone 2 is provided with an atomizing air transfer tube 5, a fuel transfer tube 6 and a conical swirl nozzle 11. The atomizing air transfer tube 5 is connected with the atomizing air intake tube 3. The fuel transfer tube 6 is connected with the fuel supply tube 4. The conical swirl nozzle 11 is connected to the atomizing air transfer tube 5 and the fuel transfer tube 6. The intake cone 2 has an end provided with the pneumatic valve 8. The intake cone 2 is configured to atomize a liquid fuel and inject the atomized fuel into the combustion chamber. The liquid fuel is broken into fine oil droplets through the conical swirl nozzle 11 under a shearing action of a high-pressure atomizing air swirling jet, and then is sprayed into the combustion chamber.

Figure 3:
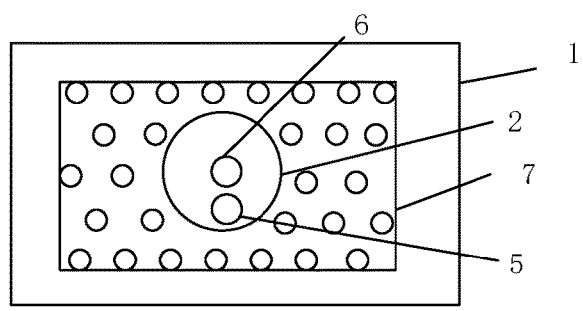
FIG. 3 is a schematic diagram showing a section view along line A-A of FIG. 1.

The pneumatic valve 8 is characterized by high speed response and adaptively operation, and includes an intake orifice plate 7, a detonation wave cut-off plate 9 and an intake cup 10. As shown in FIG. 3, the intake orifice plate 7 is a rectangular plate formed with a plurality of air intake holes evenly and equidistantly spaced apart from each other. The detonation wave cut-off plate 9 is a rectangular plate. The intake cup 10 has a rectangular cavity with an opening at one end (i.e., the right end) and holes at the other end (i.e., the left end).

When the combustion chamber is filled with fresh air and fuel through the pneumatic valve 8, the detonation wave cut-off plate 9 moves to the right, i.e., a downstream direction of airflow, under an action of an intake pressure until it is stopped by the intake cup 10, and the holes at the left end of the intake cup 10 are covered and sealed. The fresh air is injected to the combustion chamber from a cavity formed by a side wall of the intake cup 10 and the inlet pipe 1.

When detonation combustion waves are generated in the combustion chamber, some detonation combustion back-propagation waves may propagate to the left, i.e., upstream of the combustion chamber towards the inlet pipe 1, the detonation wave cut-off plate 9 moves to the left, i.e., an upstream direction of airflow under an action of a pressure of the detonation combustion back-propagation wave until it is stopped by the intake orifice plate 7, and the air intake holes of the intake orifice plate 7 are covered and sealed, blocking upstream propagation of the detonation combustion back-propagation wave and thus avoiding negative effects on the compressor.

Figure 4:
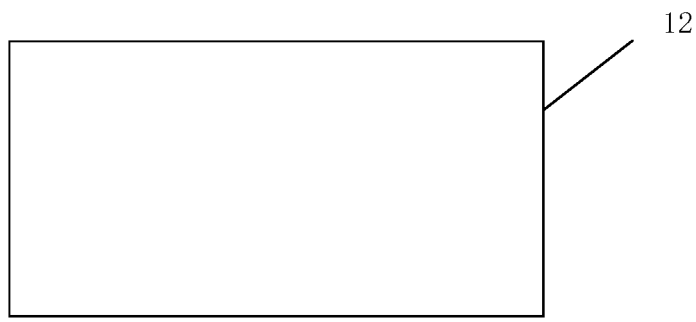
FIG. 4 is a schematic diagram showing a section view along line B-B of FIG. 1.

The pulse detonation combustion chamber 12 has a straight tubular cavity with a rectangular cross section (shown in FIG. 4), and is provided with a spark plug mounting seat 14 for mounting a spark plug 13. The fresh air and the fuel are filled into and mixed in the pulse detonation combustion chamber 12 to form a combustible mixture. The spark plug 13 is configured to ignite the combustible mixture, the flame propagates to the right to generate the detonation combustion waves, the combustion of the combustible mixture releases heat.

The gas energy distribution adjustment device 15 includes a plurality of gas baffles 16 with the same axial length. The gas baffles 16 are configured to divide the combustion chamber with the straight tubular cavity into a plurality of injecting channels with different convergence/expansion ratios. The gas energy distribution adjustment device 15 is configured to separate the pulse detonation gas formed in the pulse detonation combustion chamber 12 into a plurality of relatively weak high-temperature gas in terms of time and space. In this way, a proportion of the residence time of the high-energy gas of the pulse detonation gas in a single cycle is increased, and an energy distribution of the strong pulse detonation gas may be adjusted.

The transition section 17 is configured to discharge a pulse detonation gas formed in the combustion chamber, and connect the gas energy distribution adjustment device 15 and a turbine component located downstream. A structure, such as a shape or a size of the transition section 17 may be adjusted according to a structure of the turbine component.

As shown in FIG. 1, in some embodiments of the present disclosure, the inlet pipe 1 has a length of 500 mm, a width of 200 mm, a height of 100 mm, and a wall thickness of 3 mm. The pulse detonation combustion chamber 12 has a length of 1400 mm, a width of 200 mm, a height of 100 mm, and a wall thickness of 3 mm. The gas energy distribution adjustment device 15 has an axial length of 300 mm, a width of 200 mm, a height of 100 mm, and a wall thickness of 3 mm. The gas baffle 16 has a wall thickness of 2 mm. The rectangular cavity structure is divided by three gas baffles 16 to form four injecting channels, that is, the first injecting channel, the second injecting channel, the third injecting channel and the fourth injecting channel from top to bottom. The first injecting channel is an expansion injecting channel with an expansion ratio of 1.44, and the third injecting channel is an expansion injecting channel with an expansion ratio of 1.90. The second injecting channel is a convergence injecting channel with a convergence ratio of 2.21, and the fourth injecting channel is a convergence injecting channel with a convergence ratio of 1.43. The transition section 17 has a length of 200 mm, a width of 200 mm, a height of 100 mm, and a wall thickness of 3 mm.

In the present disclosure, a channel having an expansion ratio indicates that a size of the channel is gradually increased from an inlet of the channel to an outlet of the channel, and a channel having a convergence ratio indicates that a size of the channel is gradually decreased from an inlet of the channel to an outlet of the channel. Further, the expansion ratio refers to a ratio of an outlet cross-sectional area to an inlet cross-sectional area of a channel, and the convergence ratio refers to a ratio of an inlet cross-sectional area to an outlet cross-sectional area of a channel.

A method of operating the pulse detonation combustion system with the gas energy distribution adjustment device in some embodiments of the present disclosure includes operations as follows.

The air required by the combustion of the fuel is fed through the inlet pipe 1, and is introduced into the pulse detonation combustion chamber 12 through the intake orifice plate 7 of the pneumatic valve 8 located at the inlet pipe 1 and through a gas channel formed by the side wall of the intake cup 10 and the inlet pipe 1. The high-pressure atomizing air for atomizing the liquid fuel is fed through the atomizing air intake tube 3 mounted to the intake cone 2, and is tangentially introduced into the conical swirl nozzle 11 through the atomizing air transfer tube 5 to form a high-speed rotating atomizing air in the conical swirl nozzle 11. The liquid fuel is fed through the fuel supply tube 4 mounted to the intake cone 2, and is axially introduced to the conical swirl nozzle 11 through the fuel transfer tube 6 in the intake cone 2. In this way, the liquid fuel is sheared and broken into fine oil droplets by the high-speed rotating atomizing air in the conical swirl nozzle 11, and the fine oil droplets are injected into the pulse detonation combustion chamber 12 through the conical swirl nozzle 11 at a high speed, and are further mixed and further atomized with the air for burning the fuel in the pulse detonation combustion chamber 12 to form even smaller oil droplets. The fresh air and the atomized oil droplets are burned in the pulse detonation combustion chamber 12 to generate the pulse detonation gas with high energy, and the gas is discharged through the pulse detonation gas energy distribution adjustment device 15 and the transition section 17.

A working cycle using the pulse detonation combustion system is divided into three stages including a filling stage, a combustion stage and a discharging stage.

In the filling stage, the pneumatic valve 8 is opened under an action of intake air pressure, such that the air for burning the fuel is fed into the combustion chamber 12 through the pneumatic valve 8. At the same time, the high-pressure atomizing air and the liquid fuel are introduced into the pulse detonation combustion chamber 12 through the intake cone 2. The fresh air and the fuel are mixed in the pulse detonation combustion chamber 12 to form the combustible mixture. When the pulse detonation combustion chamber 12 is filled with the combustible mixture, the filling stage ends.

In the combustion stage, after filling, the combustion mixture filled in the pulse detonation combustion chamber 12 is ignited by a high energy spark generated by the spark plug 13 to form a weak combustion compression wave at the head of the pulse detonation combustion chamber 12. The pneumatic valve 8 is closed under the action of the back-propagation pressure, and the weak combustion compression wave is gradually superimposed and strengthened when propagating to the right of the pulse detonation combustion chamber 12 to form the detonation combustion wave. After the combustible mixture in the pulse detonation combustion chamber 12 is completely burned, the combustion stage ends.

In the discharging stage, after the combustion stage is completed, by the pulse detonation gas energy distribution adjustment device 15, the supersonic pulse detonation gas sprayed from the outlet of the pulse detonation combustion chamber 12 is separated into a plurality of high-temperature gases in terms of time and space, so as to adjust of the energy distribution of the pulse detonation gas. In other words, the gas flows into the channels formed by the gas baffles 16 to form sub-gas flows. Due to the channels have different ratios of an inlet cross-sectional area to an outlet cross-sectional area, the gas flows may have different velocities, and thus are different from each other in time and space. After the adjustment, the gas is discharged through the transition section 17, and an expansion wave is continuously propagated into the combustion chamber from an outlet of the transition section 17, and the pressure in the pulse detonation combustion chamber 12 is continuously reduced. When the intake pressure is greater than the pressure inside the combustion chamber, the discharging stage ends.

In the specification, it is to be understood that terms such as "central," "longitudinal", "lateral", "length", "width", "thickness", "upper", "lower", "front", "rear", "left", "right", "vertical", "horizontal", "top", "bottom", "inner", "outer", "upstream", "downstream", "axial direction", "radial direction" and "tangential" should be construed to refer to the orientation as then described or as shown in the drawing under discussion. These relative terms are for convenience of description and do not require that the present invention be constructed or operated in a particular orientation.

In the description of the present disclosure, it should be understood that, unless specified or limited otherwise, the terms "mounted", "connected" and "communicated" and variations thereof are used broadly and encompass such as mechanical or electrical mountings, connections and communications, also can be inner mountings, connections and communications of two components, and further can be direct and indirect mountings, connections, and communications, which can be understood by those skilled in the art according to the detail embodiment of the present disclosure.

Reference throughout this specification to "an embodiment", "some embodiments", "one embodiment", "an example", "another example" or "some examples" means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples.

The above embodiments are only to illustrate the technical idea of the present disclosure, but not construed as limiting the scope of the present disclosure. If there are any changes made on the basis of the technical solution related to the technical idea of the present disclosure, all of them should be included in the protection scope of the claims of the present disclosure.

What is claimed is:

1. A pulse detonation combustion system, comprising:
    an inlet pipe (1);
    an intake cone (2) disposed in the inlet pipe (1), having an end provided with a pneumatic valve (8), and comprising an atomizing air transfer tube (5), a fuel transfer tube (6), and a conical swirl nozzle (11) connected to the atomizing air transfer tube (5) and the fuel transfer tube (6);
    an atomizing air intake tube (3) extending from the inlet pipe (1) into the intake cone (2), and connected with the atomizing air transfer tube (5);
    a fuel supply tube (4) extending from the inlet pipe (1) into the intake cone (2), and connected with the fuel transfer tube (6);
    a pulse detonation combustion chamber (12) located downstream of and communicated to the inlet pipe (1), and provided with a spark plug mounting seat (14) for mounting a spark plug (13);
    a gas energy distribution adjustment device (15) located downstream of and communicated to the pulse detonation combustion chamber (12); and
    a transition section (17) located downstream of and communicated to the gas energy distribution adjustment device (15);
    wherein the pneumatic valve (8) comprises:
        a detonation wave cut-off plate (9);
        an intake orifice plate (7), having a first rectangular plate formed with a plurality of air intake holes evenly and equidistantly spaced apart from each other, and configured to stop the detonation wave cut-off plate (9); and an intake cup (10), having a cavity and a side wall defining an opening at one end, and providing holes at the other end configured to stop the detonation wave cut-off plate (9);

wherein an outlet of the conical swirl nozzle (11) is located in the cavity of the intake cup (10), and a gas channel is formed by the side wall of the intake cup (10) and the inlet pipe (1) to allow fresh air to flow into the pulse detonation combustion chamber (12), such that atomizing air from the conical swirl nozzle (11) is separated from the fresh air from the gas channel by the side wall of the intake cup (10);

wherein the gas energy distribution adjustment device (15) comprises:
a plurality of gas baffles (16) with a same axial length, configured to divide the straight tubular cavity into a plurality of injecting channels with a convergence ratio or an expansion ratio.

2. The pulse detonation combustion system according to claim 1, wherein the inlet pipe (1) has a rectangular cavity, and is configured to introduce air into the pulse detonation combustion chamber (12).

3. The pulse detonation combustion system according to claim 1, wherein the intake cone (2) comprises a conical head and a cylindrical main body, and is configured to atomize a liquid fuel and inject the atomized fuel into the pulse detonation combustion chamber (12).

4. The pulse detonation combustion system according to claim 3, wherein the conical swirl nozzle (11) of the intake cone (2) is configured to shear and break the liquid fuel into droplets under a shearing action of an atomizing air.

5. The pulse detonation combustion system according to claim 1 wherein the detonation wave cut-off plate (9) is movable in an axial direction of the intake cone (2).

6. The pulse detonation combustion system according to claim 5, wherein when the pulse detonation combustion chamber (12) is filled with fresh air and the liquid fuel, the detonation wave cut-off plate (9) moves to a downstream direction of airflow under an action of an intake pressure until it is stopped by the intake cup (10) to completely cover the holes of the intake cup (10).

7. The pulse detonation combustion system according to claim 5, wherein when a detonation combustion back-propagation wave is generated in the pulse detonation combustion chamber (12) and propagated upstream of the pulse detonation combustion chamber (12) towards the inlet pipe (1), the detonation wave cut-off plate (9) moves to an upstream direction of airflow under an action of a pressure of the detonation combustion back-propagation wave until it is stopped by the intake orifice plate (7) to completely cover the air intake holes of the intake orifice plate (7).

8. The pulse detonation combustion system according to claim 1, wherein the pulse detonation combustion chamber (12) has a straight tubular cavity with a rectangular cross section, and is configured to fill and mix air and fuel to form a combustible mixture.

9. The pulse detonation combustion system according to claim 8, wherein the spark plug (13) is configured to ignite the combustible mixture.

10. The pulse detonation combustion system according to claim 1, wherein the gas energy distribution adjustment device (15) has a straight tubular cavity and is configured to separate a pulse detonation gas flow formed in the pulse detonation combustion chamber (12) into a plurality of fuel gas flows.

11. The pulse detonation combustion system according to claim 10, wherein the convergence ratio ranges from 1.43 to 2.21 and the expansion ratio ranges from 1.44 to 1.90.

12. The pulse detonation combustion system according to claim 10, wherein the plurality of injecting channels comprise at least one injecting channel with a convergence ratio and at least one injecting channel with an expansion ratio that are stacked in a radial direction, and the injecting channel with the convergence ratio and the injecting channel with the expansion ratio are alternately arranged.

13. The pulse detonation combustion system according to claim 12, wherein the gas energy distribution adjustment device (15) is divided by three gas baffles (16) to form a first injecting channel, a second injecting channel, a third injecting channel and a fourth injecting channel.

14. The pulse detonation combustion system according to claim 13, wherein the first injecting channel has an expansion ratio of 1.44, the second injecting channel has a convergence ratio of 2.21, the third injecting channel has an expansion ratio of 1.90, and the fourth injecting channel has a convergence ratio of 1.43.

15. The pulse detonation combustion system according to claim 1, wherein the inlet pipe (1) has a length of 500 mm, a width of 200 mm, a height of 100 mm, and a wall thickness of 3 mm.

16. The pulse detonation combustion system according to claim 1, wherein the pulse detonation combustion chamber (12) has a length of 1400 mm, a width of 200 mm, a height of 100 mm, and a wall thickness of 3 mm.

17. The pulse detonation combustion system according to claim 1, wherein the gas energy distribution adjustment device (15) has an axial length of 300 mm, a width of 200 mm, a height of 100 mm, and a wall thickness of 3 mm.

18. The pulse detonation combustion system according to claim 1, wherein the transition section (17) is configured to discharge a pulse detonation gas formed in the pulse detonation combustion chamber (12), and connect the gas energy distribution adjustment device (15) to a turbine component located downstream.

* * * * *